United States Patent
Uchida

(10) Patent No.: US 10,886,980 B2
(45) Date of Patent: Jan. 5, 2021

(54) WIRELESS COMMUNICATION APPARATUS AND WIRELESS COMMUNICATION METHOD

(71) Applicant: Mitsubishi Electric Corporation, Tokyo (JP)

(72) Inventor: Shigeru Uchida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/478,903

(22) PCT Filed: Mar. 8, 2017

(86) PCT No.: PCT/JP2017/009289
§ 371 (c)(1),
(2) Date: Jul. 18, 2019

(87) PCT Pub. No.: WO2018/163333
PCT Pub. Date: Sep. 13, 2018

(65) Prior Publication Data
US 2019/0386716 A1    Dec. 19, 2019

(51) Int. Cl.
*H04B 7/0452*    (2017.01)
*H04B 7/06*    (2006.01)

(52) U.S. Cl.
CPC ......... *H04B 7/0452* (2013.01); *H04B 7/0617* (2013.01); *H04B 7/0697* (2013.01)

(58) Field of Classification Search
CPC .. H04B 7/0452; H04B 7/0456; H04B 7/0617; H04B 7/0697; H04B 7/08; H04L 5/0048
See application file for complete search history.

(56) References Cited

U.S. PATENT DOCUMENTS

| | | | | |
|---|---|---|---|---|
| 9,215,622 | B1* | 12/2015 | Kinamon | H04B 7/086 |
| 9,608,709 | B1* | 3/2017 | Kinamon | H01Q 3/2682 |
| 10,728,865 | B1* | 7/2020 | Cao | H04B 7/084 |

(Continued)

FOREIGN PATENT DOCUMENTS

| | | |
|---|---|---|
| JP | 2009-239481 A | 10/2009 |
| JP | 2013-135426 A | 7/2013 |
| JP | 2014-90453 A | 5/2014 |

OTHER PUBLICATIONS

Toda et al. "A Proposal of Multi-user MIMO Scheduling Method with Low Complexity", IEICE Technical Report, vol. 111, No. 289, Nov. 9, 2011, pp. 127-132.

*Primary Examiner* — Melanie Jagannathan
(74) *Attorney, Agent, or Firm* — Birch, Stewart, Kolasch & Birch, LLP

(57) ABSTRACT

A wireless communication apparatus includes a primary selection unit that selects a plurality of candidate terminals from among a plurality of terminals, based on signal-to-interference noise ratios of signals received from the plurality of terminals, a secondary selection unit that selects a plurality of transmission destination terminals from among the plurality of candidate terminals, based on channel estimate values of the candidate terminals, and a transmission processing unit that spatially multiplexes signals to be transmitted to the plurality of transmission destination terminals selected by the secondary selection unit, simultaneously on the same frequency.

2 Claims, 8 Drawing Sheets

(56) References Cited

U.S. PATENT DOCUMENTS

| | | | |
|---|---|---|---|
| 2003/0210670 A1* | 11/2003 | kisigami | H04B 1/7113 370/335 |
| 2011/0105049 A1* | 5/2011 | Yamada | H04B 7/0874 455/68 |
| 2011/0194593 A1 | 8/2011 | Geirhofer et al. | |
| 2015/0381252 A1* | 12/2015 | Kang | H04B 7/0456 370/329 |
| 2017/0214446 A1* | 7/2017 | Rappaport | H04B 7/0617 |
| 2018/0006845 A1* | 1/2018 | Kim | H04B 7/0626 |

* cited by examiner

WIRELESS COMMUNICATION APPARATUS AND WIRELESS COMMUNICATION METHOD

FIELD

The present invention relates to a wireless communication apparatus and a wireless communication method for spatial multiplexing transmission of data.

BACKGROUND

To transmit large-volume data on limited frequencies, Multi-Input Multi-Output (MIMO) systems for spatial multiplexing transmission using a plurality of transmitting and receiving antennas are being developed. The number of spatial multiplexing is expected to continue to increase for further improvements in frequency utilization efficiency.

As a method to increase the number of spatial multiplexing, a method called Multi-User MIMO (MU-MIMO) has been proposed. Standardization of MU-MIMO technology is in progress in the Third Generation Partnership Project (3GPP). In MU-MIMO, a base station simultaneously transmits to a plurality of terminals on the same radio frequency band. In MU-MIMO technology, it is important to suppress Inter-User Interference (IUI), which is interference between transmission signals to terminals. Suppression of IUI will become increasingly important as it is assumed that the maximum user spatial multiplexing number will be expanded in the future.

To suppress IUI, a precoding method called a Block Diagonalization (BD) method has been contemplated. The block diagonalization method is a precoding method of forming a beam space that has directivity to direct nulls to all terminals other than target terminals, that is, to make the received power zero. This method can prevent IUI from occurring, and can simplify processing at terminals and device configuration.

When communication is performed using a plurality of transmitting antennas, a transmission diversity effect is usually obtained. However, because the block diagonalization method performs null steering to direct nulls to terminals other than target terminals, the degree of freedom in beams formed by a base station for communication, is lost. Therefore, by the precoding to which the block diagonalization method is applied, it is difficult to form beams to increase the transmission diversity effect, that is, to improve the Signal-to-Noise Ratio (SNR) at each terminal. Especially in an environment where there are a large number of terminals, null steering for a plurality of terminals causes a large loss in the degree of freedom in beam forming. Thus, there is a problem in that it is difficult to improve transmission diversity gain by the block diagonalization method. Therefore, it is considered that in MU-MIMO environments, the importance of a method by which a base station selects transmission destination terminals increases.

Patent Literature 1 discloses, as a method by which a base station selects transmission destination terminals in an MU-MIMO environment, a method of scheduling a plurality of terminals by evaluating the performance of different combinations of the terminals, based on metrics related to signal-to-leakage ratios, spectral efficiency, or the like. Patent Literature 2 discloses, as a method by which a base station selects transmission destination terminals in an MU-MIMO environment, a method of setting terminals whose differences in direction with respect to a base station are equal to or greater than a predetermined threshold as transmission destination terminals.

CITATION LIST

Patent Literatures

Patent Literature 1: Japanese Patent Application Laid-open No. 2014-90453
Patent Literature 2: Japanese Patent Application Laid-open No. 2013-135426

SUMMARY

Technical Problem

However, the technique disclosed in Patent Literature 1 has a problem in that the amount of computation of spectral efficiency or the like increases as the number of terminals increases, as the maximum user spatial multiplexing number increases. The technique disclosed in Patent Literature 2 has a problem in that when differences in direction between terminals are not equal to or greater than the threshold, selection of terminals is impossible.

The present invention has been made in view of the above. It is an object of the present invention to provide a wireless communication apparatus capable of reducing the probability that no transmission destination terminals are selected while reducing the amount of computation required to select transmission destination terminals.

Solution to Problem

A wireless communication apparatus according to an aspect of the present invention includes a primary selection unit that selects from among a plurality of terminals a plurality of candidate terminals that are candidates for a plurality of transmission destination terminals, a secondary selection unit that selects the plurality of transmission destination terminals from among the plurality of candidate terminals, and a transmission processing unit that spatially multiplexes signals to be transmitted to the plurality of transmission destination terminals selected by the secondary selection unit, simultaneously on the same frequency. The primary selection unit selects the candidate terminals, based on signal-to-interference noise ratios of signals received from the plurality of terminals. The secondary selection unit selects the transmission destination terminals, based on channel estimate values of the candidate terminals.

Advantageous Effects of Invention

The wireless communication apparatus according to the present invention has an advantage of being able to reduce the probability that selection of transmission destination terminals becomes impossible while reducing the amount of computation required to select transmission destination terminals.

DESCRIPTION OF EMBODIMENTS

Hereinafter, a wireless communication apparatus and a wireless communication method according to embodiments of the present invention will be described in detail with reference to the drawings. Note that these embodiments are not intended to limit this invention. In the embodiments described below, a wireless base station is described as an example of the wireless communication apparatus, and wireless terminals are described as an example of terminals that communicate with the wireless communication apparatus.

First Embodiment

Figure 1:
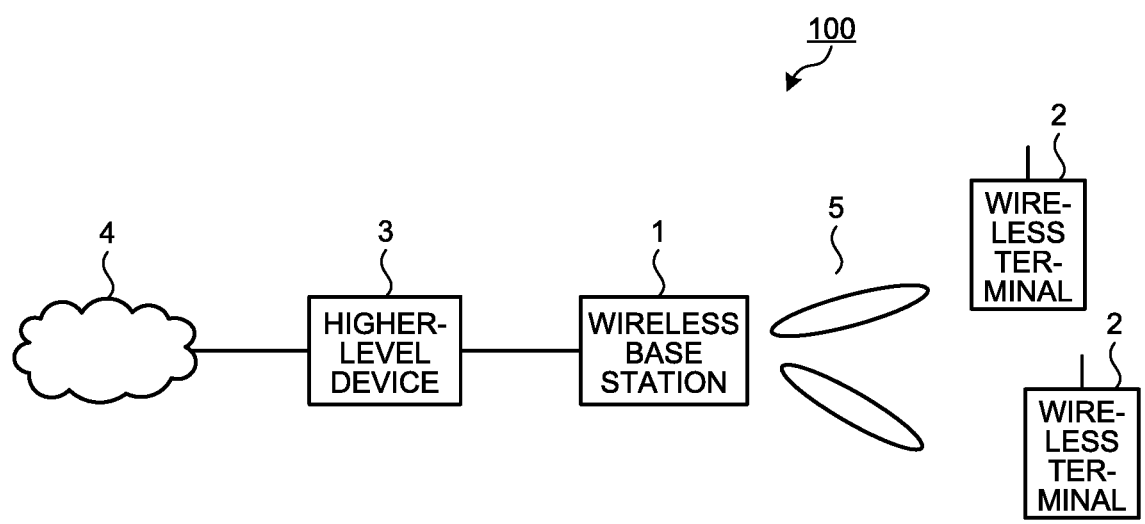
FIG. 1 is a diagram illustrating the configuration of a wireless communication system according to a first embodiment of the present invention.

FIG. 1 is a diagram illustrating the configuration of a wireless communication system 100 according to a first embodiment of the present invention. The wireless communication system 100 includes a wireless base station 1, a plurality of wireless terminals 2, and a higher-level device 3.

The wireless base station 1 is a wireless communication apparatus that performs MU-MIMO transmission to perform spatial multiplexing simultaneously on the same frequency. The wireless base station 1 can form transmission beams 5 directed to the plurality of wireless terminals 2 using a plurality of antennas. The wireless base station 1 communicates with the wireless terminals 2, which are counterpart devices, using one or more transmission beams 5.

The wireless terminals 2 are terminals each including a plurality of antennas to communicate with the wireless base station 1. Although two wireless terminals 2 are illustrated in FIG. 1, the wireless base station 1 can simultaneously communicate with three or more wireless terminals 2.

The higher-level device 3 is a device higher in level than the wireless base station 1, and is a device on the core network side. The higher-level device 3 is a gateway device, a Mobile Management Entity (MME), or the like.

The wireless base station 1 is connected to the higher-level device 3 via a communication link. The higher-level device 3 is connected to a communication network 4. The communication network 4 is a communication network that is different from a wireless communication network including the wireless base station 1, the wireless terminals 2, and the higher-level device 3.

Figure 2:
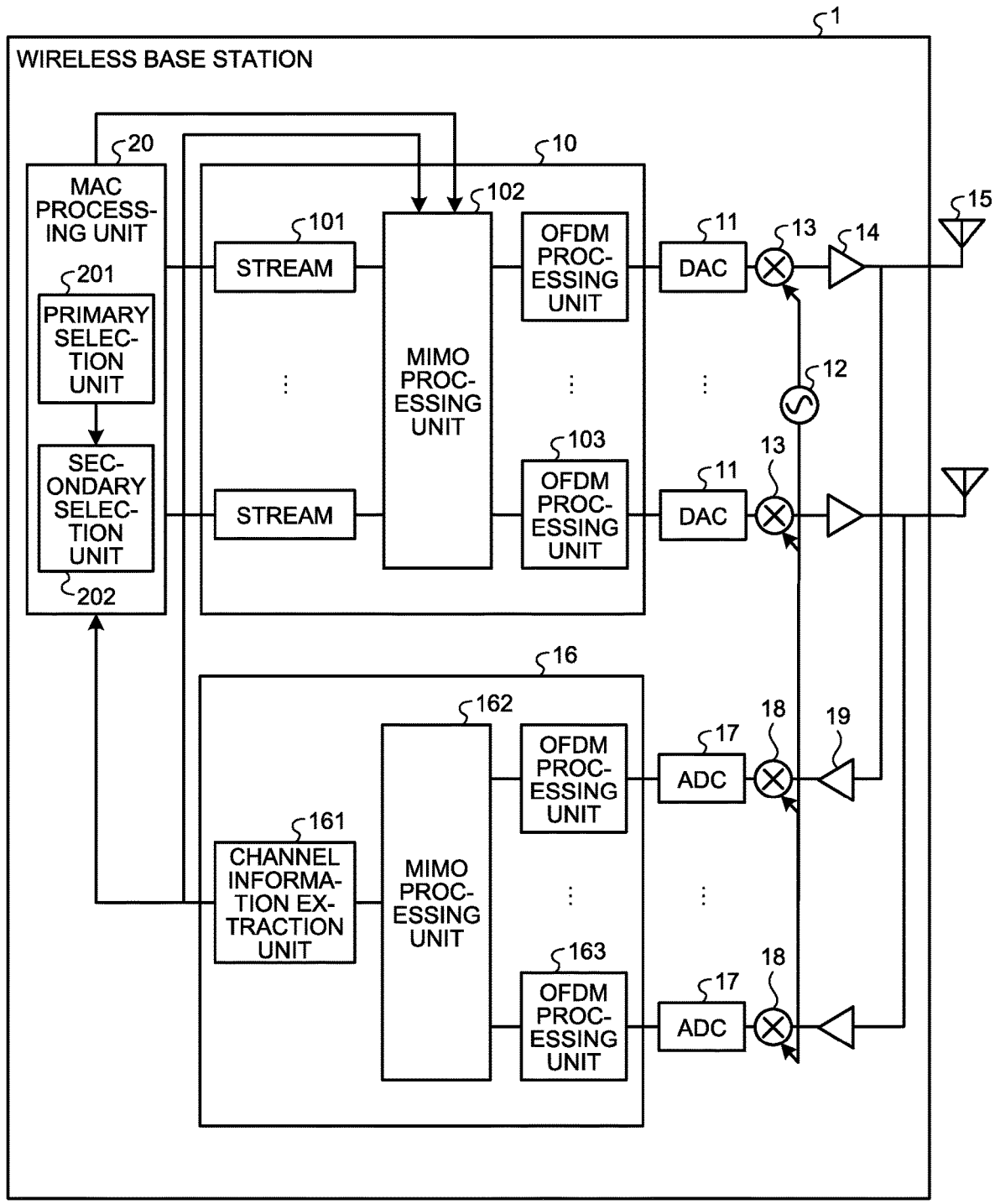
FIG. 2 is a diagram illustrating the configuration of a wireless base station illustrated in FIG. 1.

FIG. 2 is a diagram illustrating the configuration of the wireless base station 1 illustrated in FIG. 1. The wireless base station 1 includes a transmitting-side baseband processing unit 10, a plurality of Digital to Analog Converters (DACs) 11, a local oscillator 12, a plurality of mixers 13, a plurality of Power Amplifiers (PAs) 14, a plurality of antennas 15, a receiving-side baseband processing unit 16, a plurality of Analog to Digital Converters (ADCs) 17, a plurality of mixers 18, a plurality of Low Noise Amplifiers (LNAs) 19, and a Media Access Control (MAC) processing unit 20.

Note that FIG. 2 illustrates main components of the wireless base station 1, and omits components not directly related to the implementation of the present invention, for example, components for performing communication processing with the higher-level device 3.

The wireless base station 1 has a function of spatially multiplexing and simultaneously transmitting signals addressed to the wireless terminals 2, using MU-MIMO technology or single-user MIMO technology.

The transmitting-side baseband processing unit 10 is a transmission processing unit that includes a MIMO processing unit 102 and a plurality of Orthogonal Frequency Division Multiplexing (OFDM) processing units 103, and generates transmission signals to be transmitted to the wireless terminals 2. The transmitting-side baseband processing unit 10 spatially multiplexes, simultaneously on the same frequency, signals to be transmitted to a plurality of transmission destination terminals selected by a secondary selection unit 202 described later.

When streams 101 that are a signal stream group to be transmitted to the wireless terminals 2 by spatial multiplexing are input from the MAC processing unit 20, the MIMO processing unit 102 executes MIMO processing on the streams 101, including precoding after performing modulation processing. The plurality of streams 101 are data strings that contain data to be transmitted to different wireless terminals 2, and are to be spatially multiplexed and transmitted. The modulation processing is processing to modulate input signals in accordance with a modulation scheme such as Quadrature Phase Shift Keying (QPSK) or Quadrature Amplitude Modulation (QAM). The precoding is processing to multiply the streams 101 by transmission weights for weighting, and distribute transmission signals to the antennas 15. The MIMO processing unit 102 calculates the transmission weights by acquiring channel estimate values between the wireless base station 1 and the wireless terminals 2. At this time, a combination of target wireless terminals 2 is notified from the MAC processing unit 20 described later to the MIMO processing unit 102. The MIMO processing unit 102 that has executed the MIMO processing inputs the signals to the OFDM processing units 103.

The OFDM processing units 103 each perform OFDM modulation by executing Inverse Fast Fourier Transform (IFFT) processing, Cyclic Prefix (CP) addition processing, and others on the signals input from the MIMO processing unit 102, to generate transmission signals.

The DACs 11 each convert the transmission signals output by the transmitting-side baseband processing unit 10 from digital signals to analog signals.

The local oscillator 12 is an oscillator that generates a signal for frequency conversion. Each of the mixers 13 up-converts the analog signals output from corresponding one of the DACs 11 to analog signals of a carrier frequency, based on the signal output from the local oscillator 12. The PAs 14 are amplifiers for amplifying power. Each of the PAs 14 amplifies the transmission power of the signals output from corresponding one of the mixers 13, and inputs them to corresponding one of the antennas 15. The antennas 15 transmit the transmission signals using desired radio waves. The antennas 15 are directional antennas capable of forming beams having directivity, and are a multielement antenna capable of controlling array direction such as an active phased array antenna. The antennas 15 can receive signals transmitted by the wireless terminals 2. Each of the antennas 15 inputs reception signals to corresponding one of the LNAs 19.

The LNAs 19 are amplifiers for amplifying input signals. The LNAs 19 amplify reception signals input from the antennas 15, and input them to the mixers 18. Each of the mixers 18 down-converts analog reception signals of the carrier frequency input from corresponding one of the antennas 15 via corresponding one of the LNAs 19 into signals of a baseband frequency, based on a signal output from the local oscillator 12. Each of the mixers 18 inputs the down-converted reception signals to corresponding one of the ADCs 17. Each of the ADCs 17 converts the analog reception signals of the baseband frequency input from corresponding one of the mixers 18 into digital signals. The ADCs 17 input the reception signals converted into the digital signals to the receiving-side baseband processing unit 16.

The receiving-side baseband processing unit 16 includes a channel information extraction unit 161, a MIMO processing unit 162, and a plurality of OFDM processing units 163. The receiving-side baseband processing unit 16 processes signals received from the wireless terminals 2, and restores data transmitted from the wireless terminals 2.

Each of the OFDM processing units 163 executes CP removal processing, Fast Fourier Transform (FFT) processing, and others on the signals input from corresponding one of the ADCs 17 to OFDM-demodulate the reception signals.

The MIMO processing unit 162 assigns weights to and combines the OFDM-demodulated reception signals input from the plurality of OFDM processing units 163. Weighting and combining processing performed by the MIMO processing unit 162 includes, for example, channel estimation based on known sequences contained in reception signals from the wireless terminals 2, processing to calculate weights of the reception signals input from the OFDM processing units 163 based on resultant channel estimate values of the channel estimation, and processing to multiply the reception signals by the calculated weights for weighting and then combine the reception signals.

The channel information extraction unit 161 extracts, for example, channel information fed back from the wireless terminals 2, the channel information indicating the states of channels between the wireless base station 1 and the wireless terminals 2, based on demodulated signals after being weighted and combined by the MIMO processing unit 162. The channel information extraction unit 161 outputs channel estimate values included in the extracted channel information to the MIMO processing unit 102 of the transmitting-side baseband processing unit 10, and outputs the extracted channel information to the MAC processing unit 20. Alternatively, the channel information extraction unit 161 may perform channel estimation based on known sequences contained in reception signals from the wireless terminals 2, for example, Sounding Reference Signals (SRSs), and output channel estimate values obtained to the MIMO processing unit 102. Alternatively, the channel information extraction unit 161 may calculate channel information such as Signal-to-Interference Noise Ratios (SINRs), Rank Indicators (RIs), inter-receiving antenna correlation values, or inter-transmitting antenna correlation values, based on the obtained channel estimate values, and output the channel information to the MAC processing unit 20, or may output the channel estimate values themselves to the MAC processing unit 20.

The MAC processing unit 20 selects from among the wireless terminals 2 transmission destination terminals to which the wireless base station 1 performs spatial multiplexing simultaneously on the same frequency, based on the channel information input from the channel information extraction unit 161 of the receiving-side baseband processing unit 16. The MAC processing unit 20 includes a primary selection unit 201 and a secondary selection unit 202. Details of the MAC processing unit 20 will be described later.

Next, the processing of the MIMO processing unit 102 in the transmitting-side baseband processing unit 10 will be described using an MU-MIMO downlink system. In the following description, when it is necessary to distinguish the plurality of wireless terminals 2, #i (i=1, 2, ... $N_{usr}$) is used as the number of a wireless terminal 2 to call it as the wireless terminal 2 #i. To indicate a character with a bar, (bar) is sometimes written after the character. To indicate a character with a hat, (hat) is sometimes written after the character. To indicate a character with a tilde, (tilde) is sometimes written after the character.

A system model is defined as in the following formula (1), where $s_i(t)$ is a transmission signal vector of the wireless terminal 2 #i, $P_i$ is a transmission power distribution matrix, $B_i$ is a transmission precoding matrix, H(hat)$_i$ is a true $N_r \times N_t$ channel matrix, $W_i$ is a $N_{w, total} \times N_r$ reception weight matrix, $y_i(t)$ is a true reception signal vector before being multiplied by reception weight, $r_i(t)$ is a reception signal vector after being multiplied by reception weight, and n(hat)$_i(t)$ is a true reception thermal noise vector.

[Formula 1]

$$\begin{bmatrix} r_1(t) \\ \vdots \\ r_{N_{usr}}(t) \end{bmatrix} = \begin{bmatrix} W_1 & \cdots & 0 \\ \vdots & \ddots & \vdots \\ 0 & \cdots & W_{N_{usr}} \end{bmatrix} \begin{bmatrix} y_1(t) \\ \vdots \\ y_{N_{usr}}(t) \end{bmatrix} = \begin{bmatrix} W_1 & \cdots & 0 \\ \vdots & \ddots & \vdots \\ 0 & \cdots & W_{N_{usr}} \end{bmatrix} \begin{bmatrix} \hat{H}_1 \\ \vdots \\ \hat{H}_{N_{usr}} \end{bmatrix} [B_1 \cdots B_{N_{usr}}] \begin{bmatrix} \sqrt{P_1} & \cdots & 0 \\ \vdots & \ddots & \vdots \\ 0 & \cdots & \sqrt{P_{N_{usr}}} \end{bmatrix} \begin{bmatrix} s_1(t) \\ \vdots \\ s_{N_{usr}}(t) \end{bmatrix} \begin{bmatrix} \hat{n}_1(t) \\ \vdots \\ \hat{n}_{N_{usr}}(t) \end{bmatrix}$$

(1)

Here, $N_r$ indicates the number of receiving antennas, $N_t$ indicates the number of transmitting antennas, $N_{w, total}$ indicates the total number of reception signals of all users after being multiplied by reception weights, and $N_{usr}$ streams indicates the number of users.

The MIMO processing unit 102 determines the transmission power distribution matrix $P_i$ and the transmission precoding matrix $B_i$ by using the channel matrix H(hat)$_i$ acquired from the channel information extraction unit 161 in the receiving-side baseband processing unit 16. The wireless terminal 2 #i determines the reception weight matrix $W_i$. By notifying the number of streams to be transmitted to the wireless terminals 2 from the MAC processing unit 20, it is possible to set the transmission power of streams not to be transmitted to zero and distribute the corresponding transmission power to other streams.

Further, the system model is as in the following formula (2), where an $N_{w, total} \times N_t$ matrix obtained by multiplying the reception weight matrix and the true channel matrix is a new channel matrix $H_i$, and an $N_{w, total}$—order vector obtained by multiplying the true reception thermal noise vector by the reception weight matrix is a new reception thermal noise vector $n_i$.

[Formula 2]

$$\begin{bmatrix} r_1(t) \\ \vdots \\ r_{N_{usr}}(t) \end{bmatrix} = \begin{bmatrix} H_1 \\ \vdots \\ H_{N_{usr}} \end{bmatrix} [B_1 \ \ldots \ B_{N_{usr}}] \qquad (2)$$

$$\begin{bmatrix} \sqrt{P_1} & \ldots & 0 \\ \vdots & \ddots & \vdots \\ 0 & \ldots & \sqrt{P_{N_{usr}}} \end{bmatrix} \begin{bmatrix} s_1(t) \\ \vdots \\ s_{N_{usr}}(t) \end{bmatrix} + \begin{bmatrix} n_1(t) \\ \vdots \\ n_{N_{usr}}(t) \end{bmatrix}$$

Further, formula (2) can be expressed as formula (3) below.

[Formula 3]

$$\overline{r}(t) = \overline{HBP}s(t) + \overline{n}(t) \qquad (3)$$

Here, H(bar) is an $N_{w, total} \times N_t$ system channel matrix including the reception weights, and B(bar) is an $N_t \times N_{st}$ system precoding matrix. Here, $N_{st}$ is the total number of streams to all the wireless terminals 2. P(bar) is a system transmission power matrix that determines transmission power distribution to the wireless terminals 2, s(bar) (t) is an $N_{st}$-order system transmission vector, and n(bar) (t) is an $N_{w, total}$-order system noise vector after being multiplied by the reception weight. Further, the product of H(bar) and B(bar) can be regarded as an effective system channel matrix $H(bar)_e$ by transmission beam forming.

The effective system channel matrix is expressed by the following formula (4).

[Formula 4]

$$\overline{H}_e = \begin{bmatrix} H_1 B_1 & H_1 B_2 & \ldots & H_1 B_{N_{usr}} \\ H_2 B_1 & H_2 B_2 & \ldots & H_2 B_{N_{usr}} \\ \vdots & \vdots & \ddots & \vdots \\ H_{N_{usr}} B_1 & H_{N_{usr}} B_2 & \ldots & H_{N_{usr}} B_{N_{usr}} \end{bmatrix} \qquad (4)$$

In the BD method, as shown in the following formula (5), block diagonal terms, that is, $H_i B_i$ (i=1, 2, . . . , $N_{usr}$) elements in formula (4) are maintained and non-block diagonal terms other than the block diagonal terms are set to zero matrices 0.

[Formula 5]

$$\overline{H}_e = \begin{bmatrix} H_1 B_1 & 0 & \ldots & 0 \\ 0 & H_2 B_2 & \ldots & 0 \\ \vdots & \vdots & \ddots & \vdots \\ 0 & 0 & \ldots & H_{N_{usr}} B_{N_{usr}} \end{bmatrix} \qquad (5)$$

Figure 3:
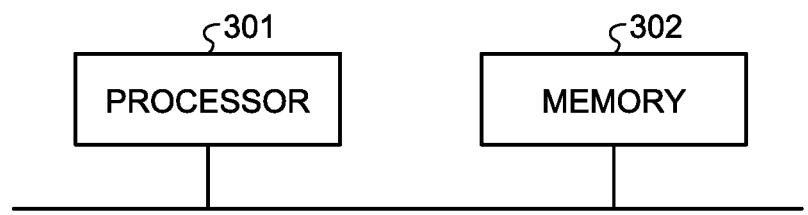
FIG. 3 is a diagram illustrating an example of a hardware configuration used for implementing functions of the wireless base station illustrated in FIG. 2.

FIG. 3 is a diagram illustrating an example of a hardware configuration used to implement the functions of the wireless base station 1 illustrated in FIG. 2.

A processor 301 is processing circuitry such as a Central Processing Unit (CPU) or a system Large Scale Integration (LSI). A CPU is also called a central processing unit, a processing unit, an arithmetic unit, a microprocessor, a microcomputer, a Digital Signal Processor (DSP), or the like.

Memory 302 is nonvolatile or volatile semiconductor memory such as Random Access Memory (RAM), Read Only Memory (ROM), a flash memory, an Erasable Programmable ROM (EPROM), or an Electrically EPROM (EEPROM); or a magnetic disk, a flexible disk, an optical disk, a compact disk, a mini disk, a Digital Versatile Disk (DVD), or the like. The memory 302 stores computer programs to be executed by the processor 301, and various data used while the processor 301 is executing the computer programs.

The transmitting-side baseband processing unit 10, the receiving-side baseband processing unit 16, and the MAC processing unit 20 of the wireless base station 1 can be implemented using the processor 301 and the memory 302, and the computer programs stored in the memory 302.

The functions of the MIMO processing unit 102 of the transmitting-side baseband processing unit 10, the MIMO processing unit 162, the channel information extraction unit 161, and the MAC processing unit 20 are partly implemented by the processor 301 reading and executing the computer programs stored in the memory 302. The functions of the MIMO processing unit 102 of the transmitting-side baseband processing unit 10, the MIMO processing unit 162 of the receiving-side baseband processing unit 16, and the MAC processing unit 20 are partly implemented by electronic circuitry. The functions of the OFDM processing units 103 and the OFDM processing units 163 can be implemented by electronic circuitry. The function of the channel information extraction unit 161 may be implemented by the processor 301 reading and executing the computer program stored in the memory 302, or may be implemented by electronic circuitry.

Figure 4:
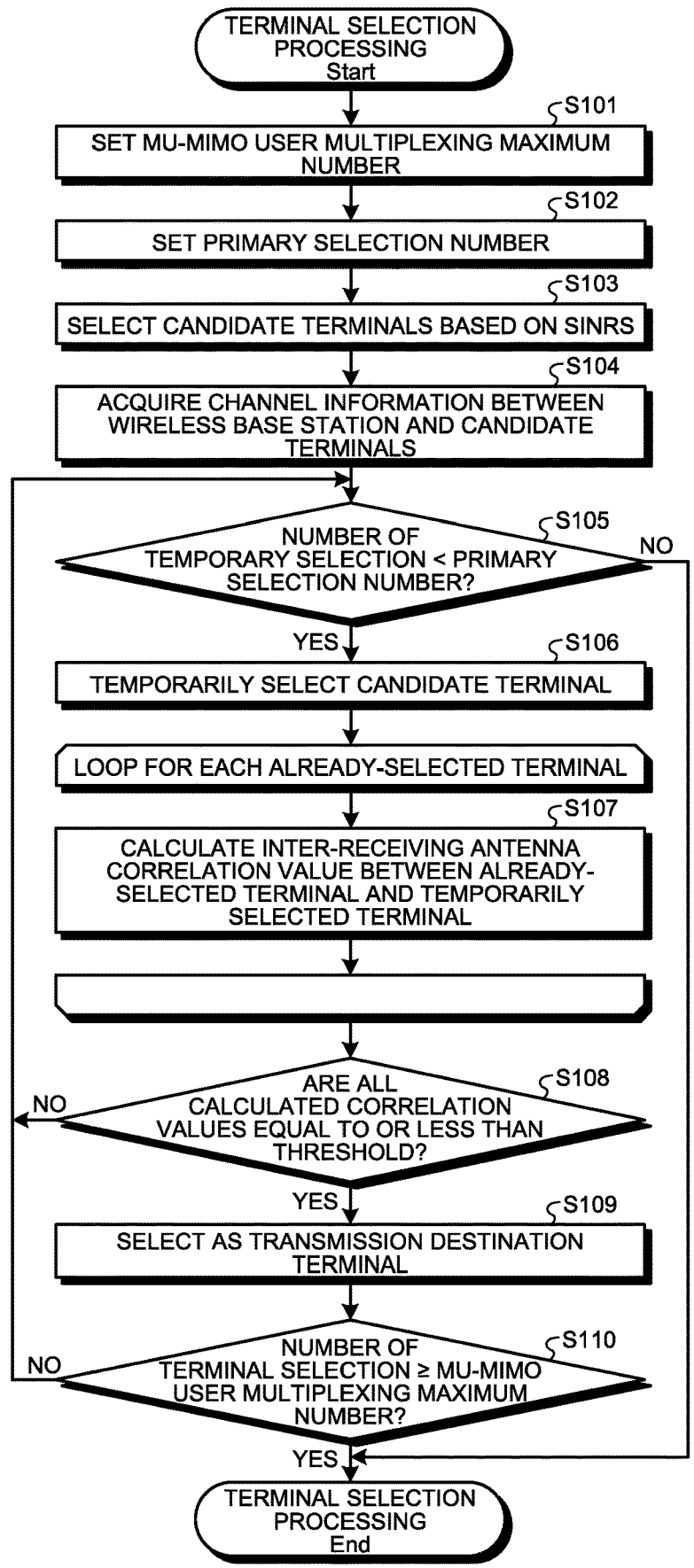
FIG. 4 is a flowchart illustrating an operation of the wireless base station illustrated in FIG. 2 to select transmission destination terminals.

FIG. 4 is a flowchart illustrating an operation of the wireless base station 1 illustrated in FIG. 2 to select transmission destination terminals. Hereinafter, of the functions of the MAC processing unit 20 of the wireless base station 1, an operation to implement the function of selecting transmission destination terminals of the wireless base station 1 will be described. Note that before the operation illustrated in FIG. 4 is performed, connection processing has already been executed between the wireless base station 1 and the wireless terminals 2. In the following description, the wireless terminals 2 on which the processing is performed are wireless terminals 2 that have already executed connection processing with the wireless base station 1.

The primary selection unit 201 of the MAC processing unit 20 sets an MU-MIMO user multiplexing maximum number that is the number of wireless terminals 2 to which the wireless base station 1 performs spatial multiplexing simultaneously on the same frequency (step S101). The primary selection unit 201 can set a fixed value determined from the number of antennas of the wireless base station 1, processing capacity of the processor, and others as the MU-MIMO user multiplexing maximum number. Alternatively, when the average of transmission quality of a plurality of wireless terminals 2 to which the wireless base station 1 is connected exceeds a standard quality, the primary selection unit 201 may increase the MU-MIMO user multiplexing maximum number beyond a standard value, and when the average of the transmission quality is below the standard quality, the primary selection unit 201 may reduce the MU-MIMO user multiplexing maximum number below the standard value.

Subsequently, the primary selection unit 201 sets a primary selection number that is the number of wireless terminals 2 to be primarily selected, based on the MU-MIMO user multiplexing maximum number (step S102). Specifically, the primary selection unit 201 can set a value obtained by adding a certain value to the MU-MIMO user multiplexing maximum number as the primary selection number. Alternatively, the primary selection unit 201 can set, as the primary selection number, a value obtained by adding a value at a certain rate in proportion to the magnitude of the MU-MIMO user multiplexing maximum number to the MU-MIMO user multiplexing maximum number.

The primary selection unit 201 selects a plurality of candidate terminals that are candidates for transmission destination terminals, based on the set primary selection number and the SINRs of signals received from the plurality of wireless terminals 2 (step S103). For example, the primary selection unit 201 may use a method known as Proportional Fairness. Specifically, the primary selection unit 201 determines an Ave_SINR$_i$ that is a time-averaged SINR, based on an SINR$_i$ that is an instantaneous SINR of the wireless terminal 2 #i, and determines a metric value metric$_i$ shown in the following formula (6), based on the Ave_SINR$_i$.

[Formula 6]

$$\text{metric}_i = \frac{\log 2(1 + SINR_i)}{\log 2(1 + \text{Ave\_SINR}_i)} \quad (6)$$

The primary selection unit 201 selects as many wireless terminals 2 as the primary selection number in decreasing order of the determined metric values metric$_i$. Here, the SINR$_i$ may be an SINR observed between a specific antenna 15 of the wireless base station 1 and a specific antenna of the wireless terminal 2, or may be an average value of a plurality of SINRs observed between a plurality of antennas 15 of the wireless base station 1 and a specific antenna of the wireless terminal 2, or may be an average value of a plurality of SINRs observed between a plurality of antennas 15 of the wireless base station 1 and a plurality of antennas of the wireless terminal 2. Alternatively, the SINR$_i$ may be a value obtained by averaging the SINRs of streams to the wireless terminal 2 #i when spatial multiplexing is performed by MIMO technology.

When it is possible to observe the SINR of each stream to the wireless terminal 2 #i, the primary selection unit 201 can use an SINR$_{i,j}$ that is an instantaneous SINR of a stream #j to determine an Ave_SINR$_{i,j}$ that is a time-averaged SINR. In this case, the primary selection unit 201 may determine a metric value metric$_i$ expressed in the following formula (7) in place of the above-described metric value metric$_i$, and select as many wireless terminals 2 as the primary selection number in decreasing order of the metric values metric$_i$.

[Formula 7]

$$\text{metric}_i = \frac{\sum_j \log 2(1 + SINR_{i,j})}{\sum_j \log 2(1 + \text{Ave\_SINR}_{i,j})} \quad (7)$$

When the primary selection unit 201 has selected candidate terminals, the process proceeds to secondary selection processing in which the secondary selection unit 202 selects transmission destination terminals from the candidate terminals based on channel estimate values. The secondary selection unit 202 acquires channel information between the candidate terminals selected by the primary selection unit 201 and the wireless base station 1 (step S104). The secondary selection unit 202 can acquire the channel information from the channel information extraction unit 161. At this time, the secondary selection unit 202 can cause the transmitting-side baseband processing unit 10 to transmit a channel information feedback instruction or a known sequence signal transmission instruction to the wireless terminals 2, to cause the wireless terminals 2 to transmit channel information or a known sequence signal. When instructing feedback to the wireless terminals 2, the secondary selection unit 202 can limit the number of antennas 15 used by the wireless base station 1 for feedback to a number smaller than the total number of antennas. The number of antennas used by the wireless terminals 2 for feedback can also be limited to a number smaller than the total number of antennas. Further, the secondary selection unit 202 can limit subcarriers used for feedback to a number smaller than the total number of subcarriers.

The secondary selection unit 202 temporarily selects a wireless terminal 2 from the candidate terminals, and determines whether to set the temporarily selected terminal that is the temporarily selected wireless terminal 2 as a transmission destination terminal. The processing is repeated until it is done on all the candidate terminals, or until the number of transmission destination terminals selected becomes the MU-MIMO user multiplexing maximum number. The details of this repetitive processing will be described below.

The secondary selection unit 202 determines whether the processing has been done on all the candidate terminals by determining whether the number of temporary selections of wireless terminals 2 is smaller than the primary selection number (step S105). When the number of temporary selections is smaller than the primary selection number (step S105: Yes), the secondary selection unit 202 temporarily selects a candidate terminal (step S106). Then, the secondary selection unit 202 calculates an inter-receiving antenna correlation value between an already-selected terminal that is a wireless terminal 2 that has already been selected as a transmission destination terminal, and the temporarily selected terminal (step S107). Calculation processing in step S107 is repeated the number of times that equals the number of already-selected terminals.

An inter-receiving antenna correlation value is a value indicating the correlation between signals transmitted between the base station 1 and candidate terminals, and can be calculated using the channel estimate values of the candidate terminals. Specifically, an inter-receiving antenna correlation value can be expressed by the following formula (8), where h$_{i,k}$ is a channel estimate value between an antenna #i of a temporarily selected terminal and an antenna #k of the wireless base station 1, h$_{j,k}$ is a channel estimate value between an antenna #j of an already-selected terminal and the antenna #k of the wireless base station 1.

[Formula 8]

$$\rho_{i,j} = \frac{\sum_k h_{i,k} h_{j,k}^*}{\sqrt{\sum_k |h_{i,k}|^2} \sqrt{\sum_k |h_{j,k}|^2}} \qquad (8)$$

When each wireless terminal 2 has a plurality of antennas, the secondary selection unit 202 may determine an inter-receiving antenna correlation value using an average between the antennas, or may calculate it with one of the plurality of antennas as a representative antenna. In formula (8), addition is performed as many times as the number of antennas of the wireless base station 1. Alternatively, a correlation value may be calculated on one representative antenna, or antennas on which addition is performed may be selected arbitrarily. Formula (8) is an example calculated using one subcarrier. Alternatively, one representative subcarrier may be used in calculation, or an average of a plurality of subcarriers may be determined. Here, inter-receiving antenna correlation values are calculated by the secondary selection unit 202. Alternatively, another functional unit may calculate inter-receiving antenna correlation values, and the secondary selection unit 202 may acquire the calculated inter-receiving antenna correlation values.

The secondary selection unit 202 determines whether all the inter-receiving antenna correlation values calculated on the temporarily selected terminal are equal to or less than a predetermined threshold (step S108). When all the inter-receiving antenna correlation values are equal to or less than the threshold (step S108: Yes), the secondary selection unit 202 selects the temporarily selected terminal as a transmission destination terminal (step S109). Then, the secondary selection unit 202 determines whether the number of terminal selections has become equal to or greater than the MU-MIMO user multiplexing maximum number (step S110). When the number of terminal selections has become equal to or greater than the MU-MIMO user multiplexing maximum number (step S110: Yes), the secondary selection unit 202 finishes the selection processing of transmission destination terminal. When the number of terminal selections is not equal to or greater than the MU-MIMO user multiplexing maximum number (step S110: No), the secondary selection unit 202 repeats the processing from step S105. When it is not determined that all the inter-receiving antenna correlation values calculated on the temporarily selected terminal are equal to less than the threshold (step S108: No), that is, when even one of the calculated correlation values exceeds the threshold, the secondary selection unit 202 repeats the processing from step S105 without setting this temporarily selected terminal as a transmission destination terminal. When the number of temporary selections is not smaller than the primary selection number, that is, when the number of temporary selections has become equal to or greater than the primary selection number (step S105: No), the secondary selection unit 202 finishes the selection processing of transmission destination terminal.

In the selection processing of transmission destination terminal described above, an inter-receiving antenna correlation value between a temporarily selected terminal and an already-selected terminal is determined, but the present invention is not limited to this example. An inter-transmitting antenna correlation value may be used, or another metric value may be used.

In the first embodiment of the present invention described above, after the primary selection processing of selecting candidate terminals that are candidates for transmission destination terminals from among the plurality of wireless terminals 2 based on SINRs is performed, transmission destination terminals are selected from among the candidate terminals based on channel estimate values. This configuration enables efficient narrowing down of transmission destination terminals without performing complicated operations on all the wireless terminals 2 from the beginning, and thus allows a reduction in the amount of computation for selecting transmission destination terminals. In addition, transmission destination terminals can also be selected from wireless terminals 2 whose differences in direction with respect to the wireless base station 1 are less than the threshold, so that it is possible to reduce the possibility that no transmission destination terminals are selected.

Second Embodiment

Figure 5:
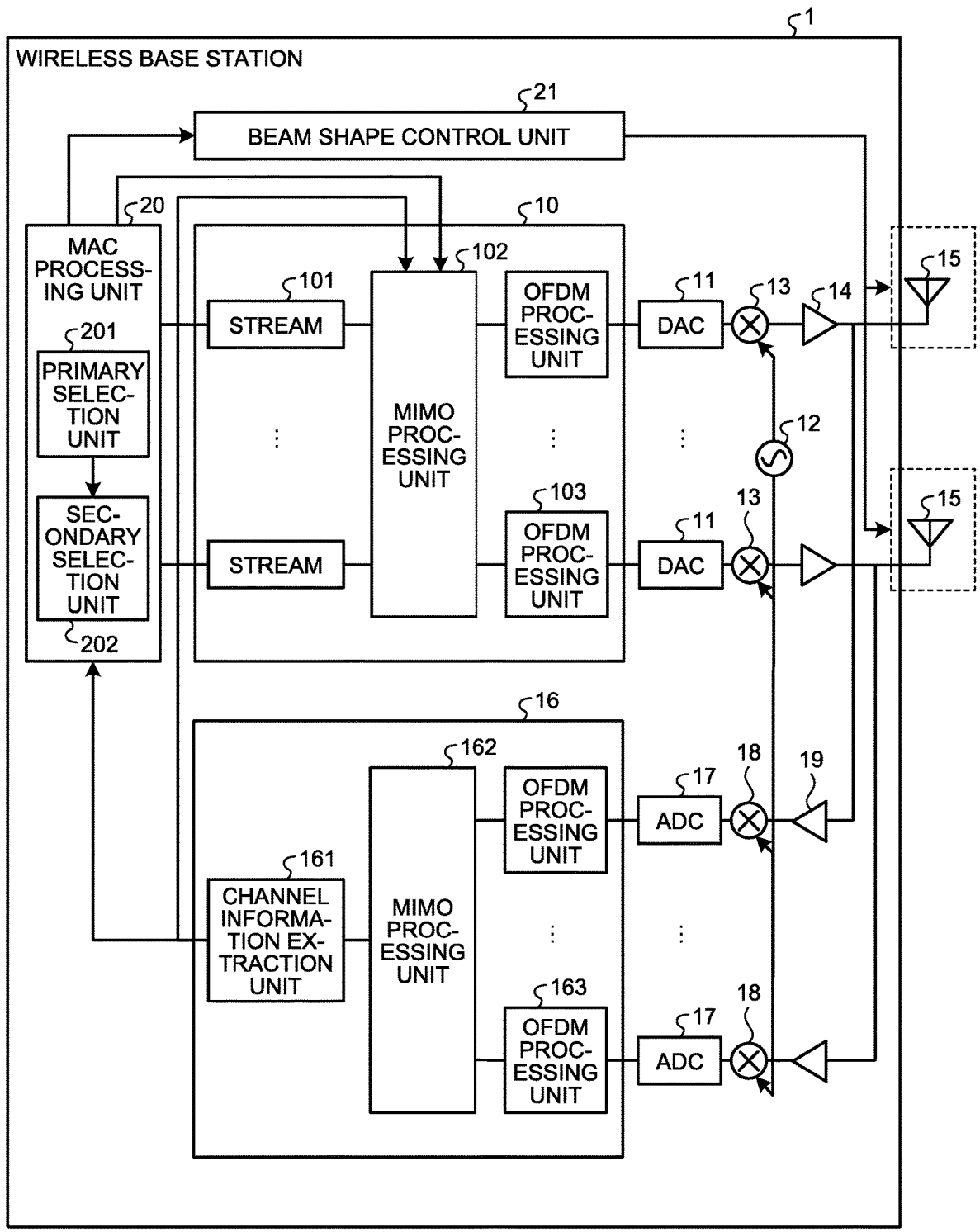
FIG. 5 is a diagram illustrating the configuration of the wireless base station according to a second embodiment of the present invention.

FIG. 5 is a diagram illustrating the configuration of the wireless base station 1 according to a second embodiment of the present invention. The configuration of the wireless communication system 100 including the wireless base station 1 illustrated in FIG. 5 is the same as that of the first embodiment, and thus the description thereof is omitted here. Of the components illustrated in FIG. 5, the same parts as those in the first embodiment will not be described here, and differences from the first embodiment will be mainly described.

The wireless base station 1 illustrated in FIG. 5 has a beam shape control unit 21 in addition to the configuration illustrated in FIG. 2. The antennas 15 are each a multielement antenna capable of controlling array direction such as an active phased array antenna, and are directional antennas capable of forming directional beams. The beam shape control unit 21 can control the shapes of beams formed by the antennas 15 by controlling the array directions of the antennas 15. The MAC processing unit 20 can detect the directions of the wireless terminals 2 with respect to the wireless base station 1. For example, the MAC processing unit 20 can detect the directions of the wireless terminals 2 with respect to the wireless base station 1 by transmitting a known sequence signal for searching for array directions from the wireless base station 1, to cause each wireless terminal 2 to feed back identification information indicating an array direction in which the SINR observed by the wireless terminal 2 is the highest to the wireless base station 1.

In the second embodiment, the secondary selection unit 202 omits the calculation of an inter-antenna correlation value between wireless terminals 2 whose directions with respect to the wireless base station 1 are in close proximity, using the directions of the wireless terminals 2 with respect to the wireless base station 1. Specifically, when calculating on each candidate terminal an inter-antenna correlation value between the candidate terminal and another candidate terminal, the secondary selection unit 202 omits calculation of an inter-antenna correlation value between a first candidate terminal and a second candidate terminal of the candidate terminals when the angle between the direction of a beam formed to communicate with the first candidate terminal and the direction of a beam formed to communicate with the second candidate terminal is equal to or greater than a predetermined angle.

Figure 6:
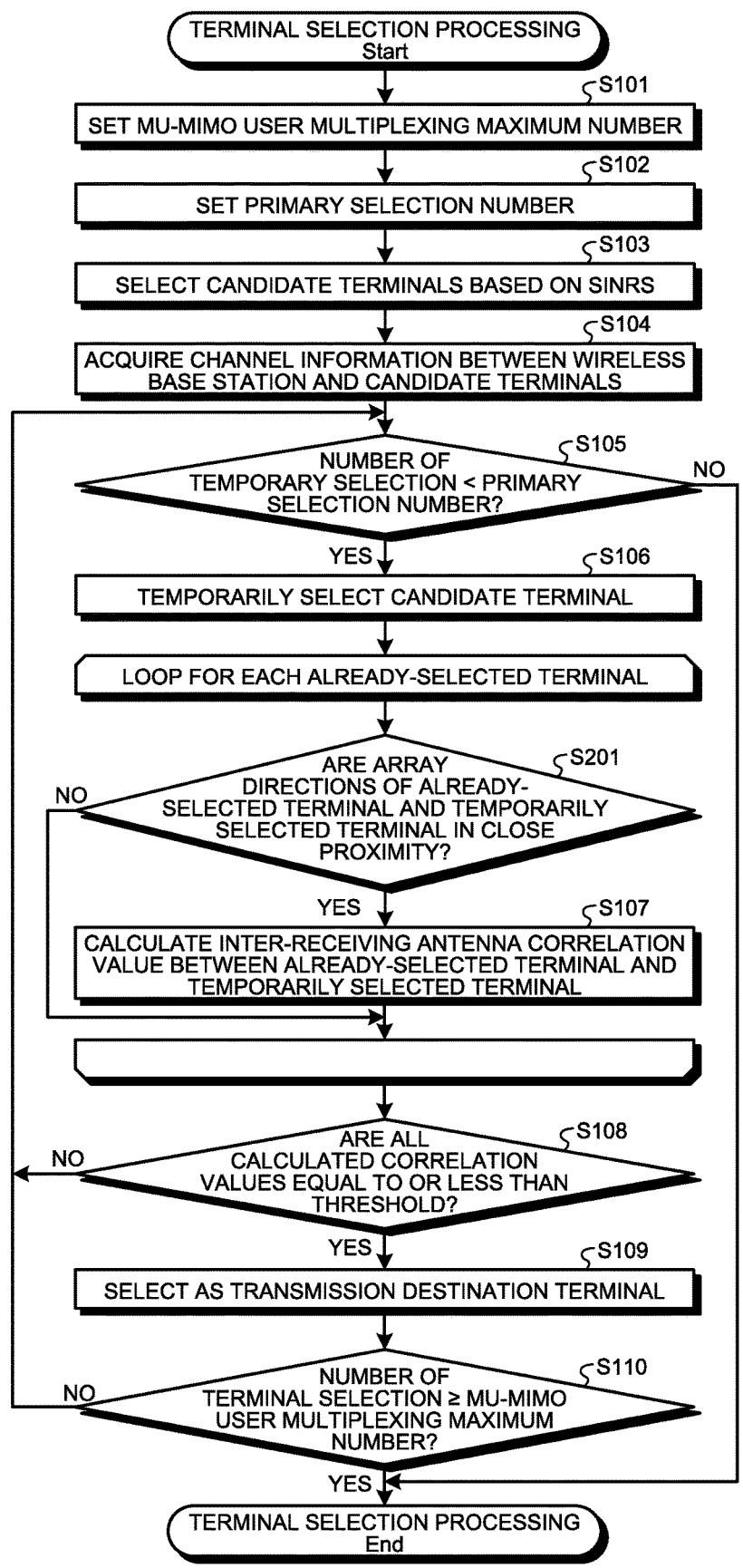
FIG. 6 is a flowchart illustrating an operation of the wireless base station illustrated in FIG. 5 to select transmission destination terminals.

FIG. 6 is a flowchart illustrating an operation of the wireless base station 1 illustrated in FIG. 5 to select transmission destination terminals. The description of parts of the operation illustrated in FIG. 6 which are the same as those of the first embodiment is also omitted.

After a candidate terminal is temporarily selected in step S106, the secondary selection unit 202 determines whether the array directions between an already-selected terminal and the temporarily selected terminal are in close proximity, specifically, whether the difference between the array directions is within a threshold (step S201). An array direction is the direction of a beam formed using an antenna 15 when the wireless base station 1 communicates with a wireless terminal 2.

When the difference between the array directions is within the threshold (step S201: Yes), the secondary selection unit 202 calculates an inter-receiving antenna correlation value between the already-selected terminal and the temporarily selected terminal (step S107). When the difference between the array directions is not within the threshold, that is, when the difference between the array directions exceeds the threshold (step S201: No), the secondary selection unit 202 omits the calculation processing of an inter-receiving antenna correlation value illustrated in step S107.

As described above, according to the second embodiment, when the difference in array direction between an already-selected terminal and a temporarily selected terminal exceeds the threshold, the calculation of an inter-receiving antenna correlation value is omitted. With this configuration, the calculation of an inter-antenna correlation value is performed only on a combination of candidate terminals whose inter-antenna correlation value is highly likely to be equal to or greater than the threshold, and the calculation of an inter-antenna correlation value is omitted on a combination of candidate terminals whose inter-antenna correlation value is highly likely to be less than the threshold. Consequently, the wireless base station 1 can further reduce the amount of computation for selecting transmission destination terminals.

Third Embodiment

Figure 7:
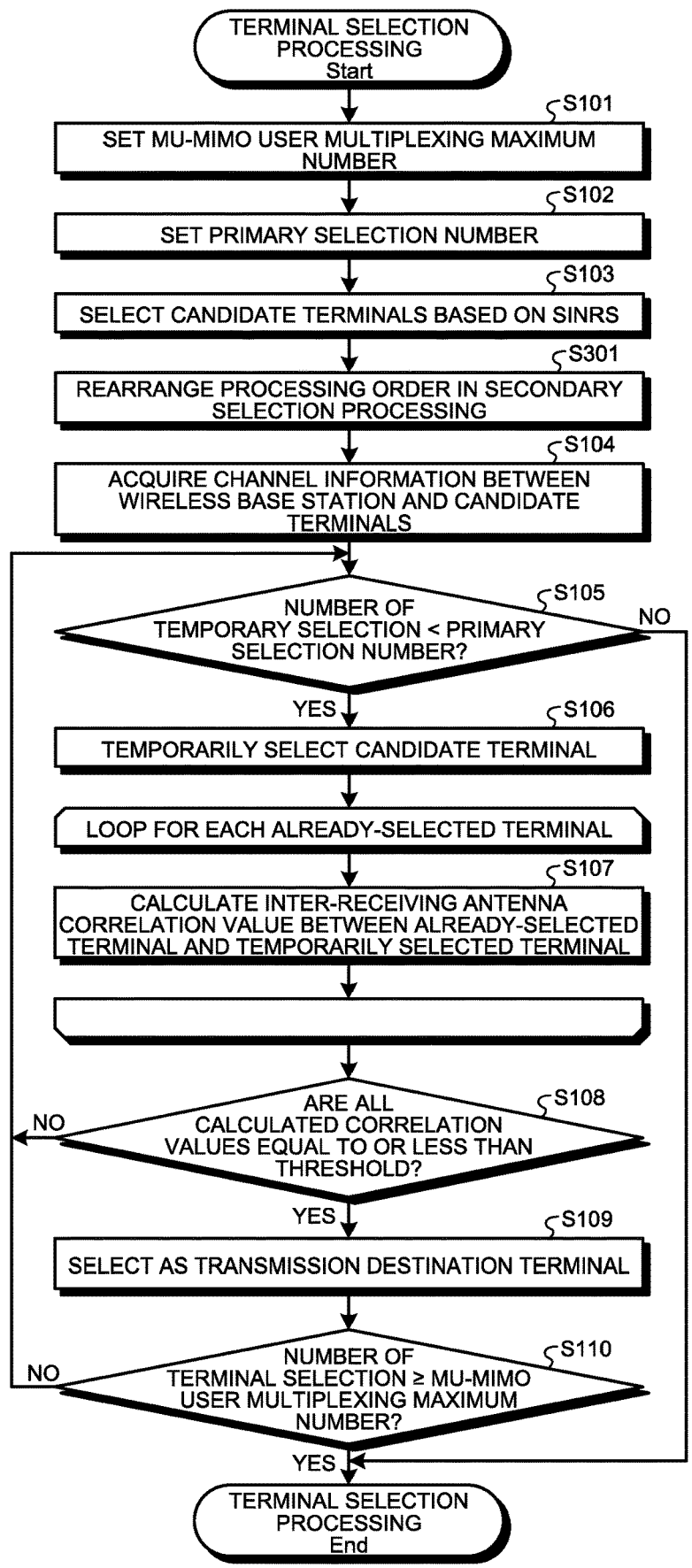
FIG. 7 is a flowchart illustrating an operation of the wireless base station according to a third embodiment of the present invention to select transmission destination terminals.

FIG. 7 is a flowchart illustrating an operation of the wireless base station 1 according to a third embodiment of the present invention to select transmission destination terminals. The configuration of the wireless base station 1 according to the third embodiment is the same as that of the first embodiment illustrated in FIG. 2, and the configuration of the wireless communication system 100 including the wireless base station 1 is the same as that of the first embodiment illustrated in FIG. 1, and thus will not be described here. Hereinafter, the operation of the wireless base station 1 will be described mainly on parts different from the operation of the first embodiment illustrated in FIG. 4.

In the third embodiment, before performing the secondary selection processing after the primary selection unit 201 performs the primary selection processing of selecting candidate terminals, the secondary selection unit 202 rearranges the processing order of the candidate terminals in the secondary selection processing based on channel quality (step S301). Here, the secondary selection unit 202 rearranges the candidate terminals in descending order of the quality of channels between the candidate terminals and the wireless base station 1, based on channel information. In the secondary selection processing, a candidate terminal processed earlier is preferentially selected as a transmission destination terminal. Thus, by rearranging the processing order, it is possible to preferentially select candidate terminals having higher channel quality as transmission destination terminals. Consequently, the performance of MU-MIMO transmission can be improved.

Fourth Embodiment

Figure 8:
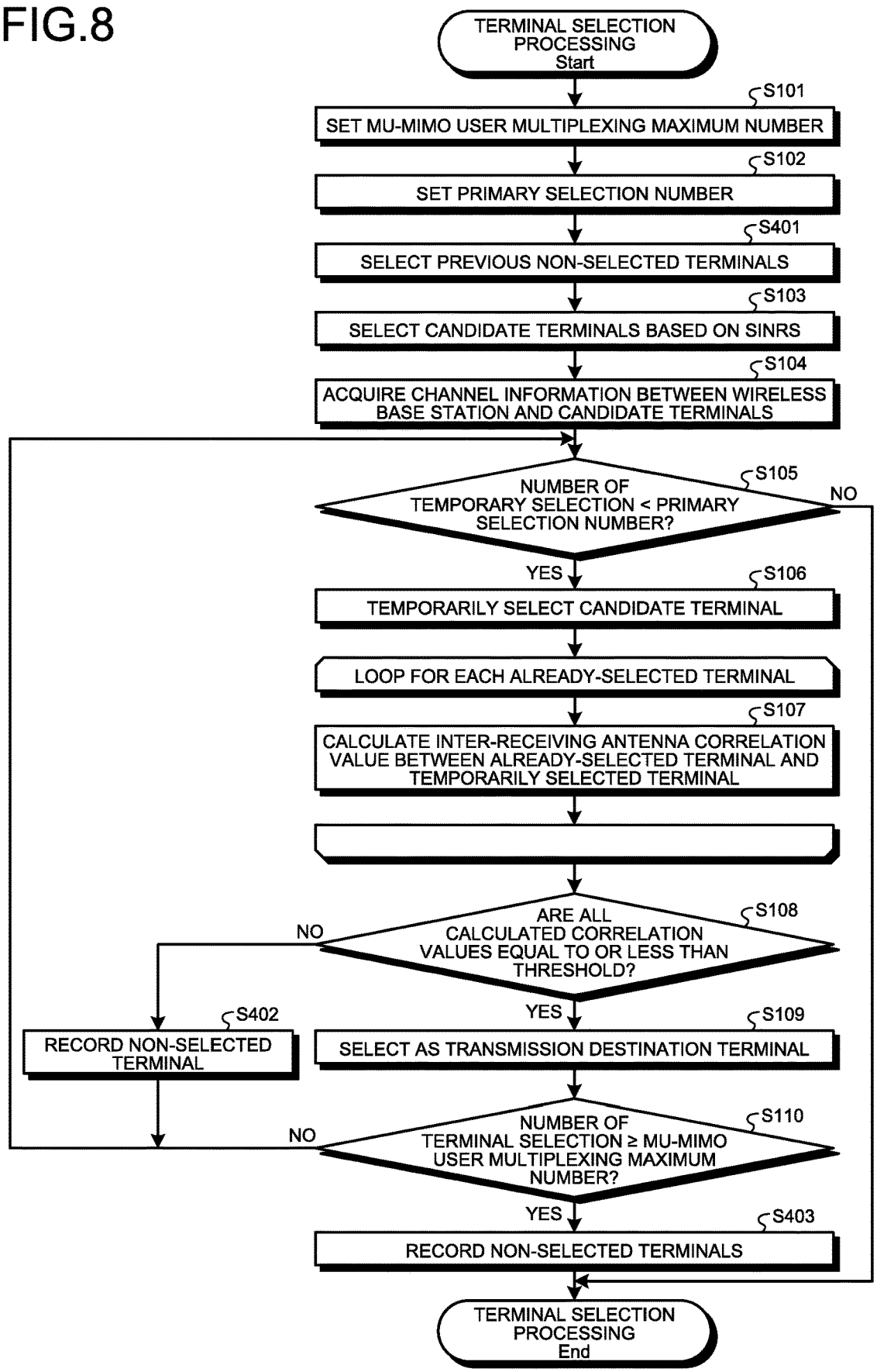
FIG. 8 is a flowchart illustrating an operation of the wireless base station according to a fourth embodiment of the present invention to select transmission destination terminals.

FIG. 8 is a flowchart illustrating an operation of the wireless base station 1 according to a fourth embodiment of the present invention to select transmission destination terminals. The configuration of the wireless base station 1 according to the third embodiment is the same as that of the first embodiment illustrated in FIG. 2, and the configuration of the wireless communication system 100 including the wireless base station 1 is the same as that of the first embodiment illustrated in FIG. 1, and thus will not be described here. Hereinafter, the operation of the wireless base station 1 will be described mainly on parts different from the operation of the first embodiment illustrated in FIG. 4.

In the fourth embodiment, when it is not determined that all the inter-antenna correlation values calculated on the candidate terminal are equal to or less than the threshold (step S108: No), the secondary selection unit 202 records the candidate terminal as a non-selected terminal (steps S402). Likewise, when the number of selected terminals is equal to or greater than the MU-MIMO user multiplexing maximum number in step S110 (step S110: Yes), one or more candidate terminals that have not been processed at that point in time are recorded as non-selected terminals (steps S403).

When selecting transmission destination terminals next time, the primary selection unit 201 preferentially selects the recorded non-selected terminals as candidate terminals. Specifically, before performing the primary selection processing in step S103 after setting the primary selection number in step S102, the primary selection unit 201 selects the previous non-selected terminals as candidate terminals (step S401).

As described above, the fourth embodiment of the present invention allows candidate terminals that have not been selected by the secondary selection unit 202 to be preferentially processed at the timing of the next selection of transmission destination terminals, and can provide equitability in the selection of transmission destination terminals.

The configurations described in the above embodiments illustrate an example of the subject matter of the present invention, and can be combined with another known art, and can be partly omitted or changed without departing from the scope of the present invention.

REFERENCE SIGNS LIST

1 wireless base station; 2 wireless terminal; 3 higher-level device; 4 communication network; 5 transmission beam; 10 transmitting-side baseband processing unit; 11 DAC; 12 local oscillator; 13, 18 mixer; 14 PA; 15 antenna; 16 receiving-side baseband processing unit; 17 ADC; 19 LNA; 20 MAC processing unit; 21 beam shape control unit; 101 stream; 102, 162 MIMO processing unit; 103, 163 OFDM processing unit; 161 channel information extraction unit; 201 primary selection unit; 202 secondary selection unit; 301 processor; 302 memory.

The invention claimed is:

1. A wireless communication apparatus comprising:

a processor;

a memory to store a program which, when executed by the processor, performs processes of:

primary selecting a plurality of candidate terminals that are candidates for a plurality of transmission destination terminals, from among a plurality of terminals based on signal-to-interference noise ratios of signals received from the plurality of terminals, and secondary selecting the plurality of transmission destination terminals from among the plurality of candidate terminals, based on inter-antenna correlation values, the inter-antenna correlation values being values indicating correlations between signals transmitted between the wireless communication apparatus and the candidate terminals and calculated using channel estimate values of the candidate terminals;

transmission processing circuitry to spatially multiplex signals to be transmitted to the plurality of transmission destination terminals selected by the secondary selection, simultaneously on the same frequency;

directional antennas; and beam shape control circuitry to control shapes of beams formed by the directional antennas when communicating with the plurality of transmission destination terminals, wherein, in the secondary selection, among the inter-antenna correlation values, the calculation of an inter-antenna correlation value between a first candidate terminal of the candidate terminals and a second candidate terminal of the candidate terminals is omitted when an angle between a direction of one of the beams formed to communicate with the first candidate terminal and a direction of one of the beams formed to communicate with the second candidate terminal is equal to or greater than a predetermined angle.

2. The wireless communication apparatus according to claim 1, wherein the secondary selection includes recording a terminal that has not been selected as the transmission destination terminal as a non-selected terminal, and the primary selection includes preferentially selecting the recorded non-selected terminal as one of the candidate terminals when selecting transmission destination terminals next time.

* * * * *